(12) United States Patent
Baldwin et al.

(10) Patent No.: US 10,469,800 B2
(45) Date of Patent: Nov. 5, 2019

(54) ALWAYS-ON TELEPRESENCE DEVICE

(71) Applicants: James A. Baldwin, Palo Alto, CA (US); Gladys Wong, Fremont, CA (US); Peter Ian Macdonald, Palo Alto, CA (US); Hedley Davis, Middletown, DE (US); Li Yang, Shanghai (CN); Du Chenyang, Shanghai (CN); Chen Guo, Shanghai (CN); Han Long, Shanghai (CN)

(72) Inventors: James A. Baldwin, Palo Alto, CA (US); Gladys Wong, Fremont, CA (US); Peter Ian Macdonald, Palo Alto, CA (US); Hedley Davis, Middletown, DE (US); Li Yang, Shanghai (CN); Du Chenyang, Shanghai (CN); Chen Guo, Shanghai (CN); Han Long, Shanghai (CN)

(73) Assignee: Antimatter Research, Inc., Palo Alto, CA (US)

( * ) Notice: Subject to any disclaimer, the term of this patent is extended or adjusted under 35 U.S.C. 154(b) by 0 days.

(21) Appl. No.: 15/784,859

(22) Filed: Oct. 16, 2017

(65) Prior Publication Data
US 2018/0309957 A1      Oct. 25, 2018

Related U.S. Application Data

(60) Provisional application No. 62/451,015, filed on Jan. 26, 2017.

(51) Int. Cl.
*H04N 7/14*       (2006.01)
*H04N 5/262*      (2006.01)
(Continued)

(52) U.S. Cl.
CPC .......... *H04N 7/147* (2013.01); *G06K 7/1417* (2013.01); *G10L 15/265* (2013.01); *G10L 21/0232* (2013.01); *G10L 25/51* (2013.01); *G10L 25/78* (2013.01); *H04L 65/1069* (2013.01); *H04L 65/403* (2013.01); *H04L 67/12* (2013.01); *H04N 5/2628* (2013.01); *H04N 5/445* (2013.01); *H04N 7/142* (2013.01); *G06K 9/00228* (2013.01); *G06T 7/70* (2017.01); *G10L 15/26* (2013.01); *G10L 25/48* (2013.01);
(Continued)

(58) Field of Classification Search
CPC ...... H04N 7/147; H04N 5/445; H04N 5/2628; H04N 7/142; H04N 2007/145; H04N 5/58; H04N 5/23238; H04N 5/60; H04L 65/403; H04L 67/12; H04L 65/1069; H04L 67/104; G06K 7/1417; G06K 9/00228; G10L 15/265; G10L 21/0232; G10L 25/78; G10L 25/51; G10L 25/48; G10L 15/26; G10L 2021/02082; G06T 7/70
See application file for complete search history.

(56) References Cited

U.S. PATENT DOCUMENTS 8,744,054 B2 *   6/2014   Dufrene ................ H04M 3/424
                                                  348/14.08
9,848,166 B2 * 12/2017   Nakano ..................... H04N 7/14
(Continued)

*Primary Examiner* — Stella L. Woo
(74) *Attorney, Agent, or Firm* — Larisa Migachyov

(57) ABSTRACT

An always-on telepresence device for permanently connecting two distinct locations in a way that allows for "incidental contact" between people at the distinct locations.

15 Claims, 6 Drawing Sheets

(51) Int. Cl.
*H04N 5/445* (2011.01)
*G10L 25/51* (2013.01)
*G10L 21/0232* (2013.01)
*G10L 15/26* (2006.01)
*G10L 25/78* (2013.01)
*G06K 7/14* (2006.01)
*H04L 29/06* (2006.01)
*H04L 29/08* (2006.01)
*G10L 21/0208* (2013.01)
*H04N 5/60* (2006.01)
*H04N 5/58* (2006.01)
*H04N 5/232* (2006.01)
*G06K 9/00* (2006.01)
*G06T 7/70* (2017.01)
*G10L 25/48* (2013.01)
*H04N 5/247* (2006.01)

(52) U.S. Cl.
CPC .. *G10L 2021/02082* (2013.01); *H04L 67/104* (2013.01); *H04N 5/23238* (2013.01); *H04N 5/247* (2013.01); *H04N 5/58* (2013.01); *H04N 5/60* (2013.01); *H04N 2007/145* (2013.01)

(56) References Cited

U.S. PATENT DOCUMENTS

| | | | |
|---|---|---|---|
| 2010/0039498 A1* | 2/2010 | Liu | G09B 21/00 348/14.09 |
| 2010/0066804 A1* | 3/2010 | Shoemake | H04N 7/147 348/14.02 |
| 2010/0332579 A1* | 12/2010 | Sengupta | G06F 16/951 709/201 |
| 2011/0134237 A1* | 6/2011 | Belt | G06K 9/00771 348/135 |
| 2013/0329000 A1* | 12/2013 | Cain | H04N 7/152 348/14.08 |
| 2014/0268511 A1* | 9/2014 | Martinez | H05K 5/02 361/679.01 |
| 2016/0379660 A1* | 12/2016 | Wright | H04S 1/002 381/57 |
| 2017/0034362 A1* | 2/2017 | Liu | H04M 1/725 |
| 2017/0048488 A1* | 2/2017 | Novak | H04N 7/147 |
| 2018/0131899 A1* | 5/2018 | Song | H04N 7/14 |
| 2018/0136824 A1* | 5/2018 | Knoppert | G06F 3/017 |
| 2019/0007648 A1* | 1/2019 | Serrano | H04N 21/2187 |

* cited by examiner

ALWAYS-ON TELEPRESENCE DEVICE

CROSS-REFERENCE TO RELATED APPLICATIONS

The present application takes priority from Provisional App. No. 62/451,015, filed Oct. 16, 2016, which is incorporated herein by reference.

BACKGROUND

As offices, workplaces, and families become more fragmented and geographically scattered, we rely more and more on various communication technologies to connect us. Phone calls, chat, text messages, and videoconferencing can fill the gaps in communication.

One problem with any such communication technologies, however, is that they do not capture "incidental" contact. For example, two coworkers who work in the same office may see each other spontaneously at a watercooler and have a short conversation. If the coworkers were working in separate offices, they may still schedule regular conference calls, but it won't be as spontaneous a conversation as a random water-cooler chat.

Similarly, families that are scattered geographically may have regular phone calls or even video calls to maintain a close connection. However, that still does not replace the incidental contact of seeing a family member in the kitchen and having a spontaneous conversation. Scheduled contact is never the same as spontaneous contact.

While theoretically it is possible to connect a videoconferencing device to a service and leave it on, most videoconferencing services are extremely bandwidth-intensive and generally do not allow a user to just leave them on. Furthermore, most videoconferencing services are intended for a user who is sitting right in front of the camera and microphone rather than a user who is wandering in and out; thus, their cameras and microphones tend to not be very good at picking up images or sound from a user who is wandering all over the room.

Since most videoconferencing services are designed to connect more than two points, they use up a lot of bandwidth in doing so. Two approaches to videoconferencing connections are peer-to-peer and group chat. A peer-to-peer connection between A, B, and C would mean that the system runs three connections—AB, BC, and AC. This means that for each participant, there are two outgoing video connections, which takes up a lot of bandwidth. Obviously, the more participants there are, the more connections there are and the more bandwidth is used; the peer-to-peer approach does not scale very well. An alternative to that is group chat, which connects A, B, and C to a cloud server, which then delivers the video/audio stream to every participant. While this scales better, this means that a cloud service will then have to be maintained, which is expensive. Furthermore, the bandwidth of each connection will need to be regulated.

Another issue with existing videoconferencing services and devices is that the connection is occasionally lost and has to be reestablished. If a user is not very technically adept, this is a very frustrating and complicated process, and takes away from the experience of a "real" contact.

Finally, existing videoconferencing services typically employ very small screens and do not adjust those screens or audio speakers to simulate real-life contact. No one will mistake an iPad or laptop screen for a window into another office or another home.

A need exists for a simple, easy-to-use, two-point videoconferencing system that is always on and that provides a video and audio simulation of real-life incidental contact.

SUMMARY OF THE INVENTION

An object of the present invention is to provide a communication system that is simple to connect, does not require any attention or setup after it's initially connected, and stays always-on.

Another object of the present invention is to provide a communication device that provides an opportunity for "incidental contact".

The system of the present invention comprises two communication devices, each one comprising a video display, an audio emission system, an audio capture device, a video capture device, and a computing device connected to all the other components. Each computing device comprises a unique identification code, and they are configured to only connect to each other and to no other device. The connection between the two devices is an always-on connection.

In an embodiment, if the connection between the two devices is accidentally interrupted, it is automatically reestablished.

The two communication devices are preferably configured to connect to each other by the following steps. First, a QR code comprising the other device's unique ID is presented to the video capture device. The video capture device is used to transmit the QR code to the computing device, which reads the other device's unique ID from the QR code and configures the computing device to only connect to a device bearing that unique ID.

The QR code may be presented to the video capture device on a smartphone screen or on a sheet of paper.

In an embodiment, the QR code comprises the address of a server; when it is displayed for the video capture device, the computing device connects to the server and the server provides the other device's unique ID for the computing device and configures the computing device to only connect to a device bearing that unique ID.

In an embodiment, at least one of the video capture devices is a wide-angle camera.

In an embodiment, at least one of the audio capture devices is a far-field echo canceling microphone.

In an embodiment, at least one computing device is configured to determine if a person's face is present in the video data and zoom in on the person's face.

In an embodiment, at least one computing device is configured to determine if a particular person is present; the other computing device then notifies a user when that particular person is present.

In an embodiment, at least one of the video displays life size images.

In an embodiment, at least one of the communication devices provides closed captioning.

In an embodiment, at least one video display is a television and the computing device comprises a bracket for mounting the computing device on the television.

In an embodiment, the video displayed on the video display changes depending on the head position of a user located in front of the video display.

In an embodiment, audio is muted when no human voices are present in the audio data.

In an embodiment, even if the audio is muted, it is un-muted if the audio data comprises a call for help.

In an embodiment, the system automatically adjusts the brightness of the video display and the volume of the audio so that it matches the real-world levels detected by the video and audio capture device on the other communication device.

In the preferred embodiment, the first computing device connects to the second computing device by a peer-to-peer network connection. If a peer-to-peer network connection is permanently or temporarily unavailable, the first computing device connects to the second computing device via a central server.

LIST OF FIGURES

DETAILED DESCRIPTION OF THE PREFERRED EMBODIMENT

Figure 1:
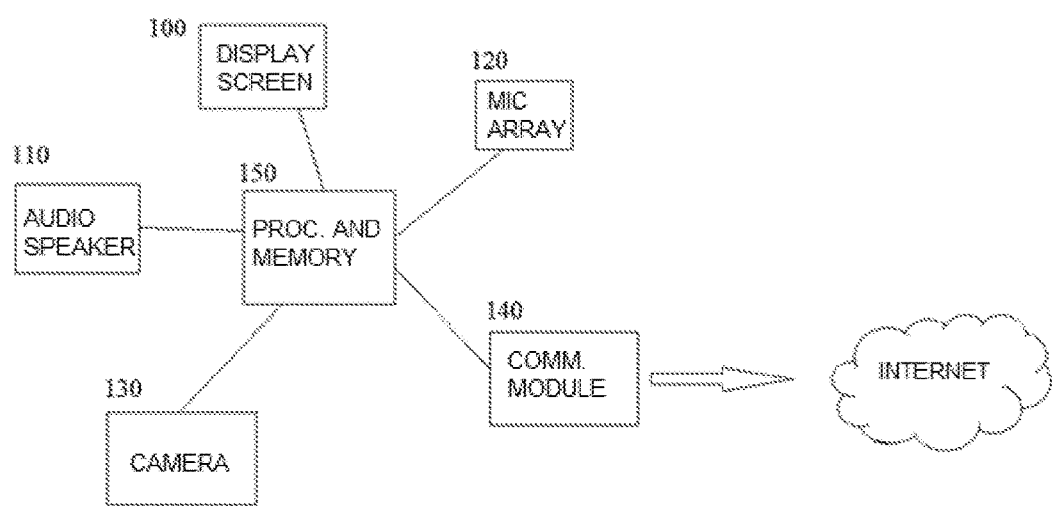
FIG. 1 shows a block diagram of a communication device of the present invention.

Turning now to FIG. 1, the system of the present invention comprises two identical communication devices connected to each other by a network. Each communication device comprises a display screen 100, an audio speaker 110, a microphone array 120, a camera 130, a communication module 140, and a processor and memory 150.

The display screen 100 is preferably a television, and the audio speaker 110 is preferably the speaker of the television; however, any display screen, such as a computer monitor or a projector, may be used with the present invention; similarly, any speaker maybe used with the present invention. In the preferred embodiment, the display screen 100 is preferably large enough so that the images on the screen are life-size. While this is not required to practice the present invention, having life-size images on the screen adds to the feeling of having a "portal" into another room and adds to the realism of the experience.

Figure 2:
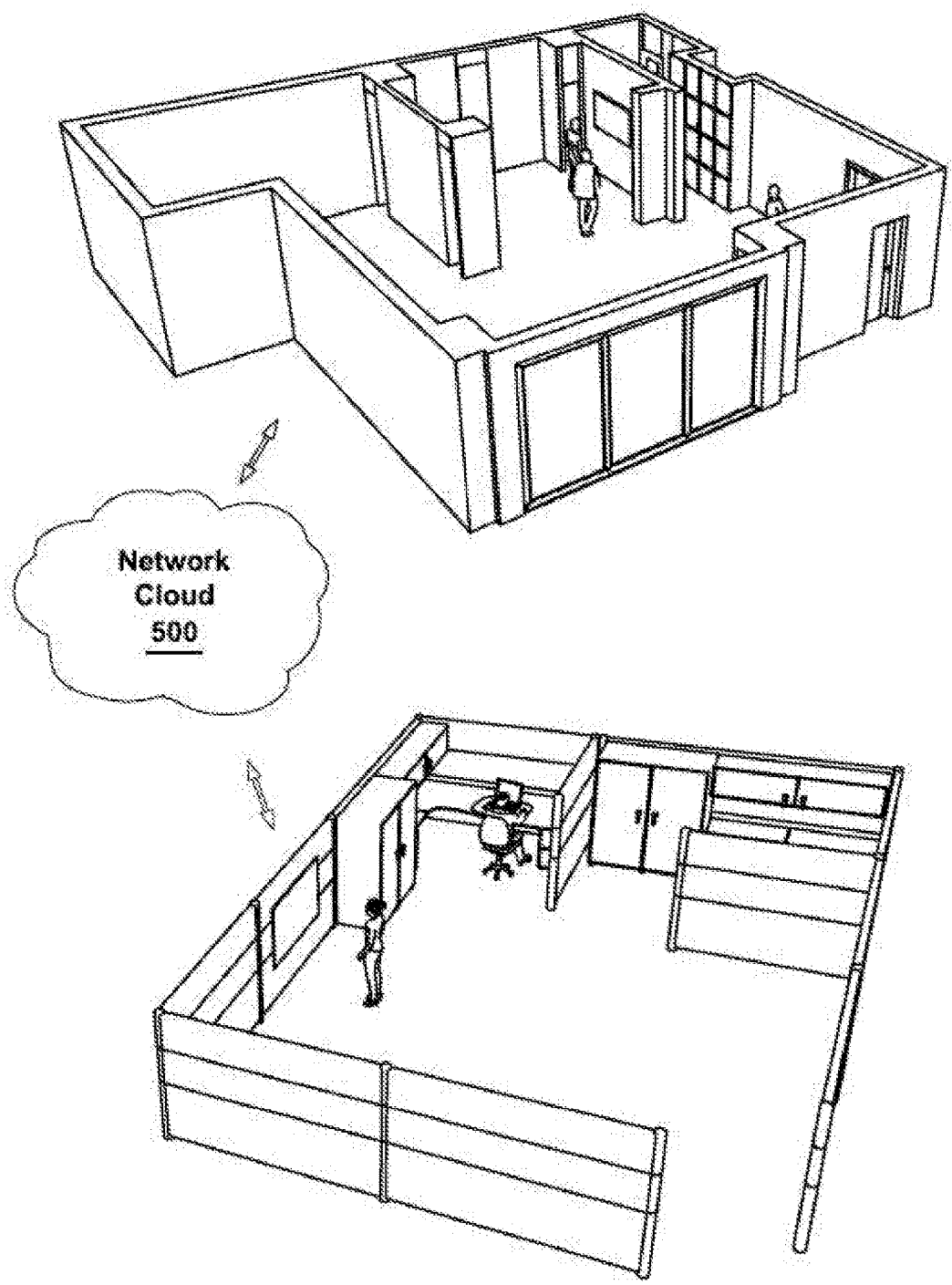
FIG. 2 shows the preferred embodiment of the present invention in use.

The camera 130 used with the preferred embodiment of the present invention is preferably a wide-angle camera that can capture a view of an entire room. Prior art videoconferencing systems tend to use narrow-angle cameras that work only if a person is sitting in front of the computer; since the present invention is built for "incidental contact", when a user may be wandering in and out of a room, it needs to capture a wider view. Similarly, the microphone 120 used with the preferred embodiment of the present invention is preferably a far-field echo canceling microphone array; an embodiment of such an array is shown in FIG. 2. Such a microphone array is good at picking up sound from a distance, which is needed if a user is wandering in and out of the room or walking around the room as they talk The communication module 140 is preferably able to connect to the Internet by a wi-fi connection or an Ethernet cable. As discussed above, the communication module 140 only connects to one other device over a network. The communication module 140 is preferably provisioned prior to first use with the unique identification code of the other device. This enables any further use of the communication device to be effortless; the connection is simply always on, and the communication device requires no attention or setup from the user once it is initially provisioned. If the connection is interrupted, the communication module attempts to reconnect automatically to the other device; no attention or action by the user is required. The communication module preferably connects to the other device by a peer-to-peer network connection; however, if peer-to-peer is blocked by a network issue or by some other problem, the communication module can connect to a central server to maintain the connection to the other device. The communication module preferably selects the best method of connection—peer-to-peer or central server—depending on the situation (i.e. available bandwidth and available connections).

The processor and memory 150 preferably comprise enough computing power and memory to control the camera, microphone, display screen, and speaker. In the preferred embodiment, the processor and memory comprise programming that enables it to receive data from the camera and microphone and transmit it over a network to another communication device, as well as programming that enables it to perform certain other functions that may be needed in some embodiments of the present invention, which will be discussed hereinbelow.

FIG. 2 shows a view of the present invention in use in an office environment. As can be seen in the Figure, the present invention provides a simple "portal" into another room. This enables "incidental contact" between two geographically distinct spaces that feels as immediate as looking through an open door into another room. In the embodiment shown in the Figure, both communication devices are connected to the cloud 500.

Figure 3:
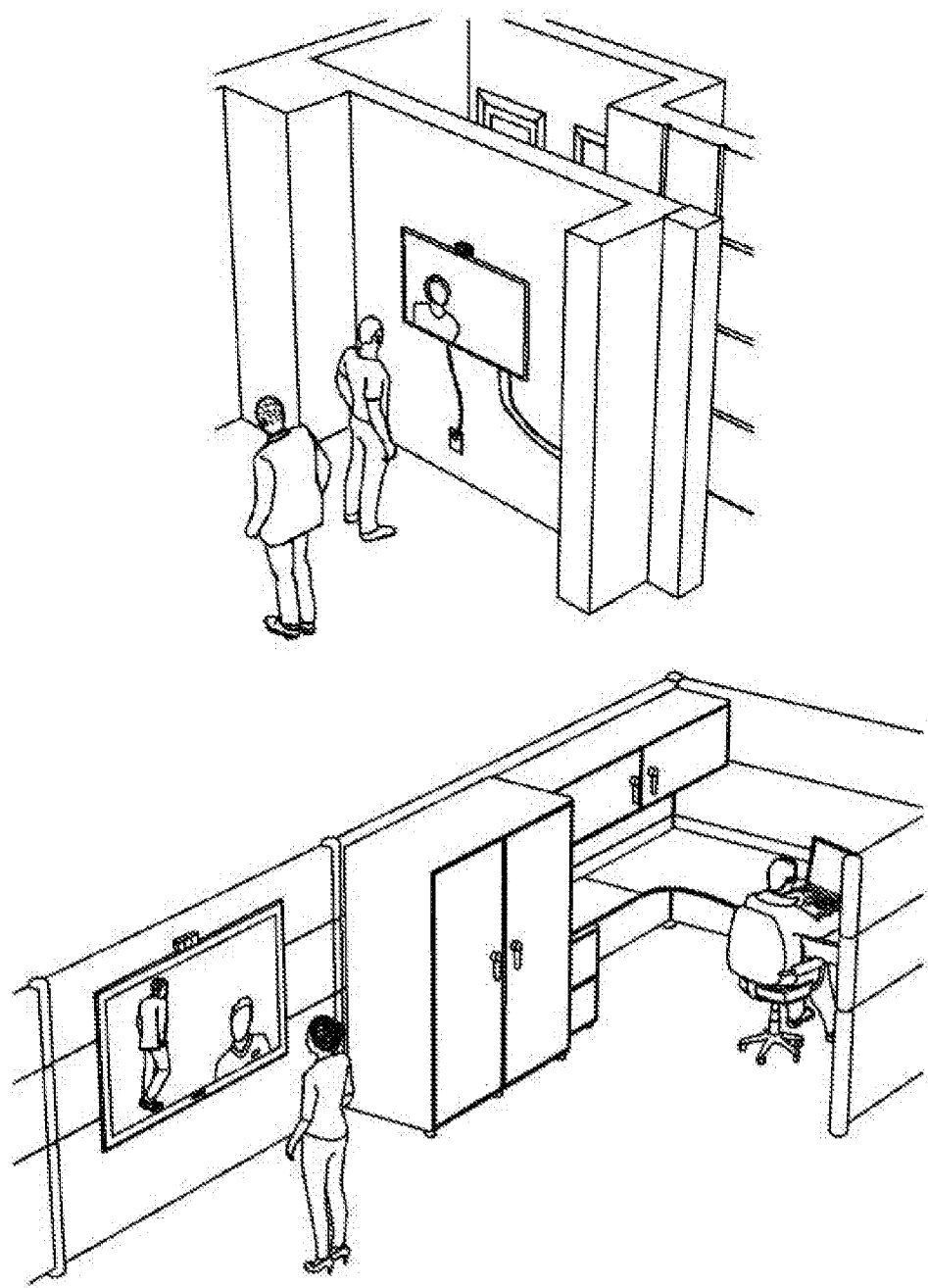
FIG. 3 shows a close-up view of the preferred embodiment of the present invention in use.

FIG. 3 shows a close-up view of the present invention in use. As can be seen, the display is preferably large enough to allow life-size images and located in such a way that it could be perceived as a "window" or "portal". Since it is always-on, it becomes an expected feature of the office and the people one sees on the screen are perceived as part of one's normal social environment.

There are many applications for the present invention. For example, it may be used to unite two offices of the same company; an employee at one office can simply "run into" another employee at a different office at the watercooler and have a chat, thus exchanging ideas and establishing a stronger personal connection with the other employee. It may be used to unite families; a grandparent living far away may simply see and hear their grandchild at any time and enjoy frequent incidental contact. It may be used to help patients in long-term care feel connected to the world; a communication device such as this may be placed in a nursing home room so that the patient has an always-on and realistic view of their family or friends. Other applications of the invention may doubtless become apparent as time goes on.

Figure 4:
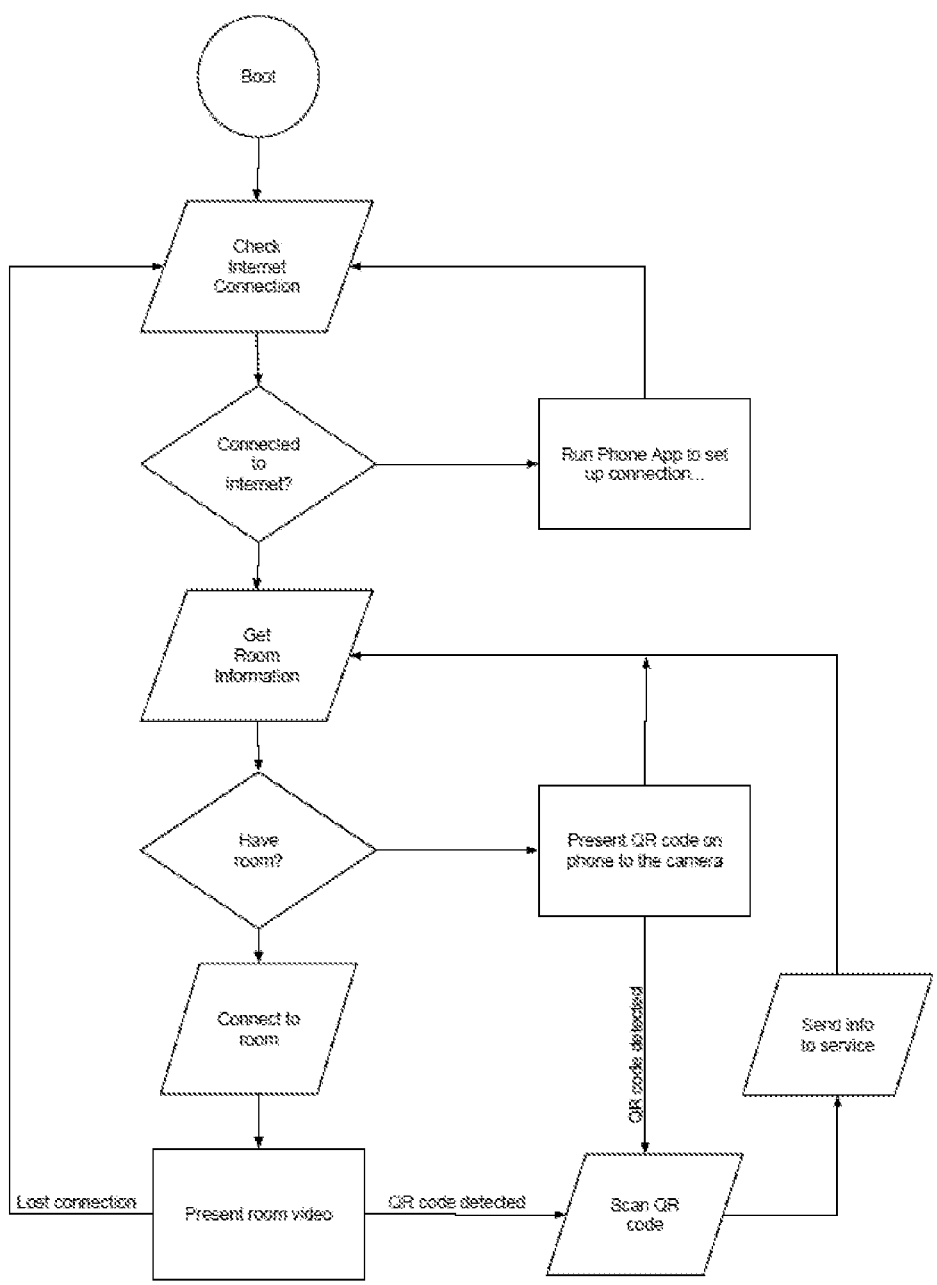
FIG. 4 shows an embodiment of the provisioning method of the present invention.

FIG. 4 shows a method of provisioning the communication device of the present invention. As discussed above, the provisioning step is performed only once; after the communication device is paired with another communication device, it stays connected to the other communication device until the connection is interrupted, in which case it will attempt to reconnect automatically. The provisioning step needs to be simple and foolproof, since some of the potential users are the elderly, hospital patients in nursing homes, and other people who are not very tech-savvy.

As shown in FIG. 4, the first step is checking whether or not the communication device is connected to the Internet. If it is not connected to the Internet, the connection is first set up. This may be done by means of a phone app or an Ethernet cable. The phone app preferably connects to the communication device and provides an interface by which a user can enter a wi-fi network and password so that the communication device can connect to the Internet.

Figure 5:
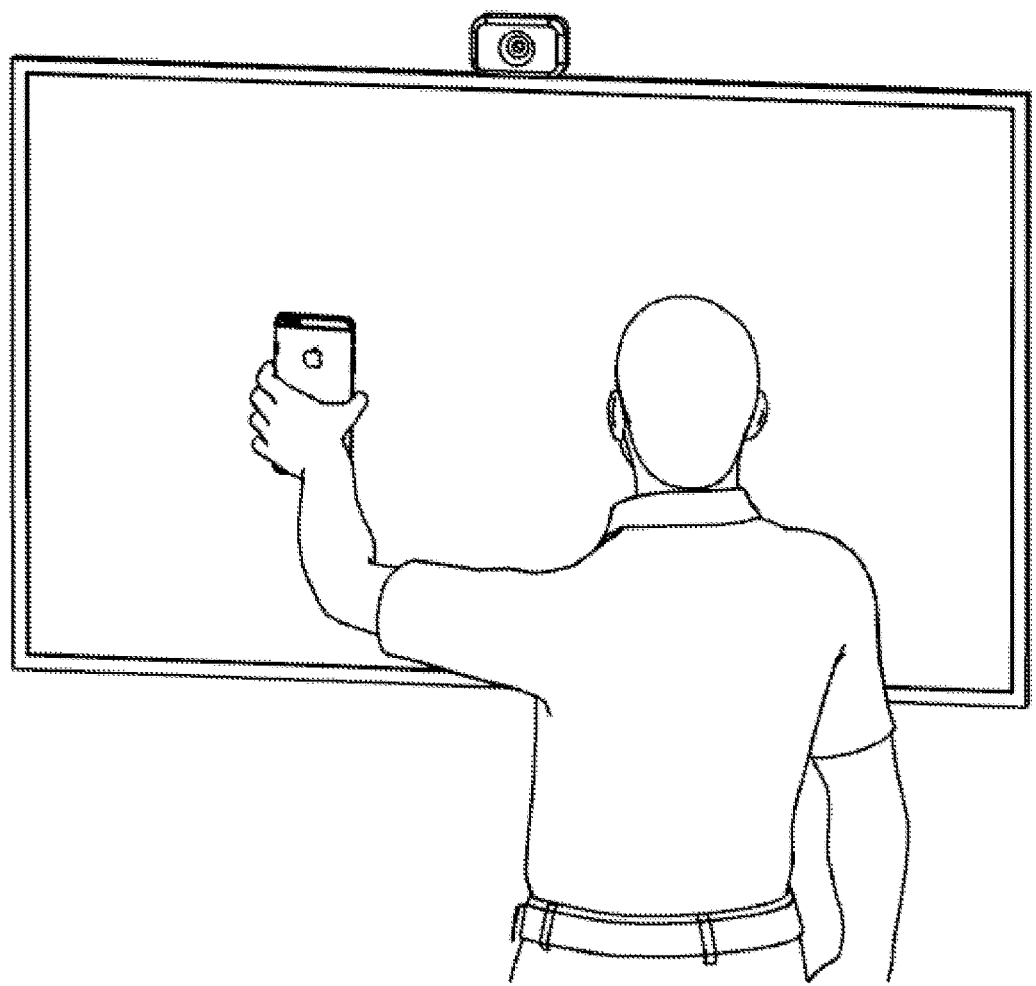
FIG. 5 shows a user performing an embodiment of the provisioning method of the present invention.

After the communication device is connected to the Internet, it gets the "room" information—i.e. the address of another communication device to which it needs to connect. If the room is present, it connects to the room and presents the room video to the user. If the room is not present, it prompts the user to present a QR code (either printed out on paper or displayed on the screen of a smartphone) to the camera. FIG. 5 shows a user displaying a QR code to the camera on the screen of a smartphone. Once it detects a QR code, it scans it and sends the information to a server, which reads it, determines the address of the room, and connects the device to the room.

The video of the room (together with audio) is then presented until the connection is interrupted, in which case the system goes through the same steps of establishing the Internet connection and re-finding the room. Also, if a QR code is ever displayed in the system's field of vision, it scans it, sends the information to a server, and then connects to a different room if the QR code encodes a different room.

In an embodiment, the provisioning step may be performed by calling a phone number instead of a displaying a QR code. In that embodiment, a user would call a phone number while standing in front of the communication device. The phone would then play a particular sound which would be picked up by the microphone of the present invention; the sound would then be sent to a server for decoding and the address of the room will be identified. The device will then be connected to the room.

Figure 6:
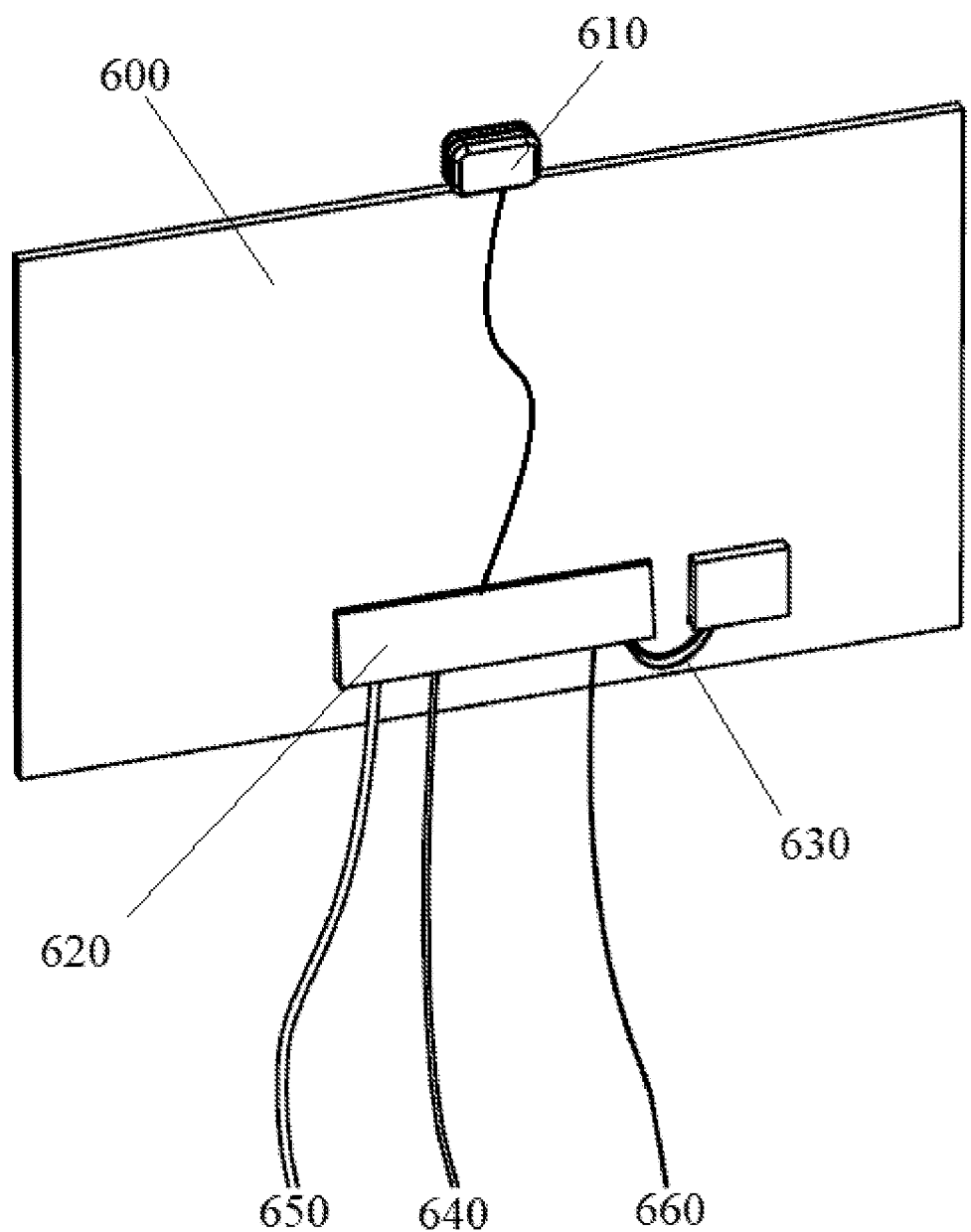
FIG. 6 shows an embodiment of the housing of the present invention.

FIG. 6 shows the back view of the preferred embodiment of the system of the present invention. In the preferred embodiment, the display is a large-screen television 600, which also provides the speakers (not shown in the Figure). The camera and microphone module 610 is located at the top of the television to provide optimal viewing. The processor and memory are located in housing 620, which is attached to the back of the television 600 and connected to it via an HDMI cable 630. An Ethernet cable 640, an HDMI cable 650, and a power cord 660 extend from the housing 620.

While the following features are not required for practicing the present invention, they may be present in alternate embodiments.

In an embodiment, the present invention detects the head position of a user positioned in front of the device and adjusts the view based on any changes in the user's head position. This is intended to create greater realism in showing the display as a "portal" into another room. The adjustment to the view is preferably the same as a user would see if they were looking through a window into a real room and changing their head position. The system may turn off this feature if more than one user is present in front of the device, or adjust the view depending on the head position of one of the users (for example, the user who is closest to the device or the user who is talking).

In an embodiment, the present invention automatically adjusts the volume, brightness, and color of the display to match what it is in the real scene received by the other communication device. This adds to the realism of the scene. To adjust the volume, the system preferably measures the signal-to-noise ratio of the sound generated by the speakers and compares it to the signal-to-noise ratio of the sound received by the microphones and adjusts the speakers until the two are identical. Similarly, to adjust the brightness and color, the system preferably measures the brightness and tone values of the visual information received by the camera and adjusts the brightness and tone values of the screen until the two are identical.

In an embodiment, the present invention comprises a "privacy curtain" that may be used to turn off the camera or microphone when the user wishes for privacy. The "privacy curtain" may be an actual curtain drawn across the screen, to add to the realism of the device (in which case, the curtain preferably comprises a proximity switch that turns off the camera and microphone), or a simple switch. In an embodiment, the camera and microphone may be turned off with a hand gesture.

In an embodiment, the present invention is configured to identify any faces present in the video stream and to zoom in on a face. If only one person's face is present in the room, the system zooms in on that face. If more than one face is present in the room, the system may zoom in on the face of the person who is talking, or may zoom in on both faces. In an embodiment, the system may display the zoomed-in face in a separate area of the screen while maintaining a view of the entire room on the screen.

In an embodiment, the present invention is configured to perform facial recognition and identifies the users present in the room. This enables the system to send a notification if a particular user enters the room or to mute the sound and/or turn off the display when no one is present. The notification may be delivered to a user's smartphone or played as a sound.

In an embodiment, the present invention is configured to identify hand gestures made by a user. This enables the user to interact with the system. For example, the system may identify a particular gesture as a "panic button", and send an emergency signal if the user makes that gesture.

In an embodiment, the system detects any human voices present in the sound received by the microphones. If human voices are present, the system generates closed captioning of their speech and sends it to the other device to be displayed on the screen.

In an embodiment, the video/audio stream may be recorded.

Exemplary embodiments are described above; it will be understood that the present invention is limited only by the appended claims.

The invention claimed is:

1. A video communication system, comprising:
 a first communication device, said first communication device comprising:
  a first video display;
  a first audio emission system;
  a first audio capture device;
  a first video capture device;
  a first computing device, wherein the first computing device is connected to the first video display, the first audio emission system, the first audio capture device, and the first video capture device;
  wherein the first computing device has a unique first identification code;
 a second communication device, said first communication device comprising:
  a second video display;
  a second audio emission system;
  a second audio capture device;
  a second video capture device;
  a second computing device, wherein the second computing device is connected to the second video display, the second audio emission system, the second audio capture device, and the second video capture device;

wherein the second computing device has a unique second identification code;

wherein the first computing device is configured to only connect to a computing device possessing the second identification code and to no other device;

wherein the second computing device is configured to only connect to a computing device possessing the first identification code and to no other device;

wherein the first computing device and the second computing device connect to each other via a network, wherein the first computing device transmits data received from the first video capture device and first audio capture device to the second computing device, wherein the second computing device displays data received from the first computing device on the second video display device and second audio emission system, wherein the second computing device transmits data received from the second video capture device and second audio capture device to the first computing device, wherein the first computing device displays data received from the second computing device on the first video display device and first audio emission system;

wherein the first computing device and the second computing device are continuously connected to each other via an always-on connections;

wherein the first computing device is configured by performing the following steps:
using a telephone to call an automated system;
using the automated system to play a sound recording via the telephone,
wherein the sound recording comprises the second identification code presented in a machine-readable format;
presenting the sound recording to the first audio capture device;
using the first audio capture device to transmit the sound recording to the first computing device;
using the first computing device to read the second identification code from the sound recording;
configuring the first computing device to only connect to a device bearing the second identification code.

2. The system of claim 1, wherein the first computing device and the second computing device are further configured to reestablish the connection if it is interrupted, wherein the reestablishment of the connection is automatic.

3. The system of claim 1, wherein at least one of the video capture devices is a wide-angle camera.

4. The system of claim 1, wherein at least one of the audio capture devices comprises a far-field echo canceling microphone.

5. The system of claim 1, wherein at least one of the first computing device and the second computing device is configured to:
determine if a person's face is present in the video data transmitted to the computing device;
process the video data in such a way as to zoom in on the person's face to result in processed video data;
display the processed video data on the video display.

6. The system of claim 1, wherein at least one of the first computing device and the second computing device is configured to:
determine if a particular person is present in the video data transmitted to the computing device;
notify a user if the particular person is present, wherein the notifying step may be performed by at least one of the following: an audio signal, a video signal, a signal sent to the user's telephone.

7. The system of claim 1, wherein at least one of the first video display and the second video display displays life-size images.

8. The system of claim 1, wherein the first computing device is configured to:
receive audio data from the second computing device;
identify speech in the audio data;
display closed captioning of the speech on the first video display.

9. The system of claim 1, wherein the first video display is a television, wherein the first computing device comprises a bracket for mounting the first computing device on the television.

10. The system of claim 1, wherein the first computing device is further configured to:
determine if a user is in the field of view of the first video capture device;
determine a change in the user's head position;
adjust the video data displayed on the first video display depending on the change in the user's head position.

11. The system of claim 1, wherein the first computing device is configured to:
analyze the audio data received from the second computing device;
determine if any human voices are present in the audio data;
mute the audio if no human voices are present in the audio data.

12. The system of claim 11, wherein the first computing device is further configured to:
determine if the audio data comprises a call for help;
un-mute the audio if the audio data comprises a call for help.

13. The system of claim 1, wherein the first computing device is configured to perform at least one of the following steps:
adjust the brightness of the first video display so that it matches the ambient light levels received by the second video capture device;
adjust the volume of the first audio display so that it matches the volume of sound received by the second audio capture device.

14. The system of claim 1, wherein the first computing device connects to the second computing device by a peer-to-peer network connection.

15. The system of claim 14, wherein the first computing device is further configured to perform the following actions:
determine if a peer-to-peer network connection to the second computing device is available;
if a peer-to-peer network connection to the second computing device is unavailable, connecting to the second computing device via a cloud server.

* * * * *